April 10, 1951 P. BAKKER 2,548,191
MULTIEXCHANGE AUTOMATIC TELEPHONE SYSTEM
Original Filed May 4, 1942 5 Sheets-Sheet 1
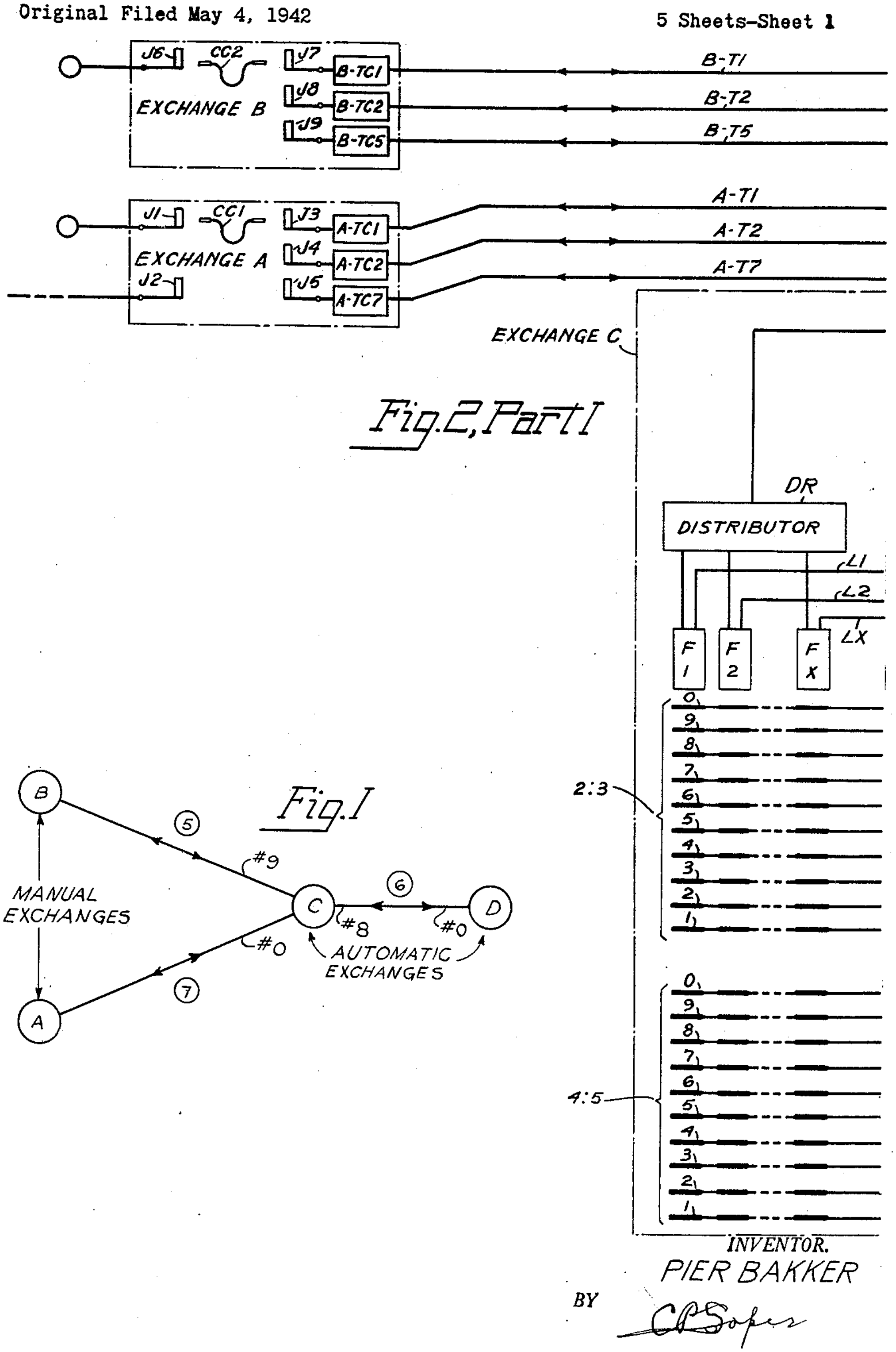
Fig. 2, Part I, Fig. 1
INVENTOR.
PIER BAKKER
BY [signature]
ATTORNEY April 10, 1951 P. BAKKER 2,548,191
MULTIEXCHANGE AUTOMATIC TELEPHONE SYSTEM
Original Filed May 4, 1942 5 Sheets-Sheet 2
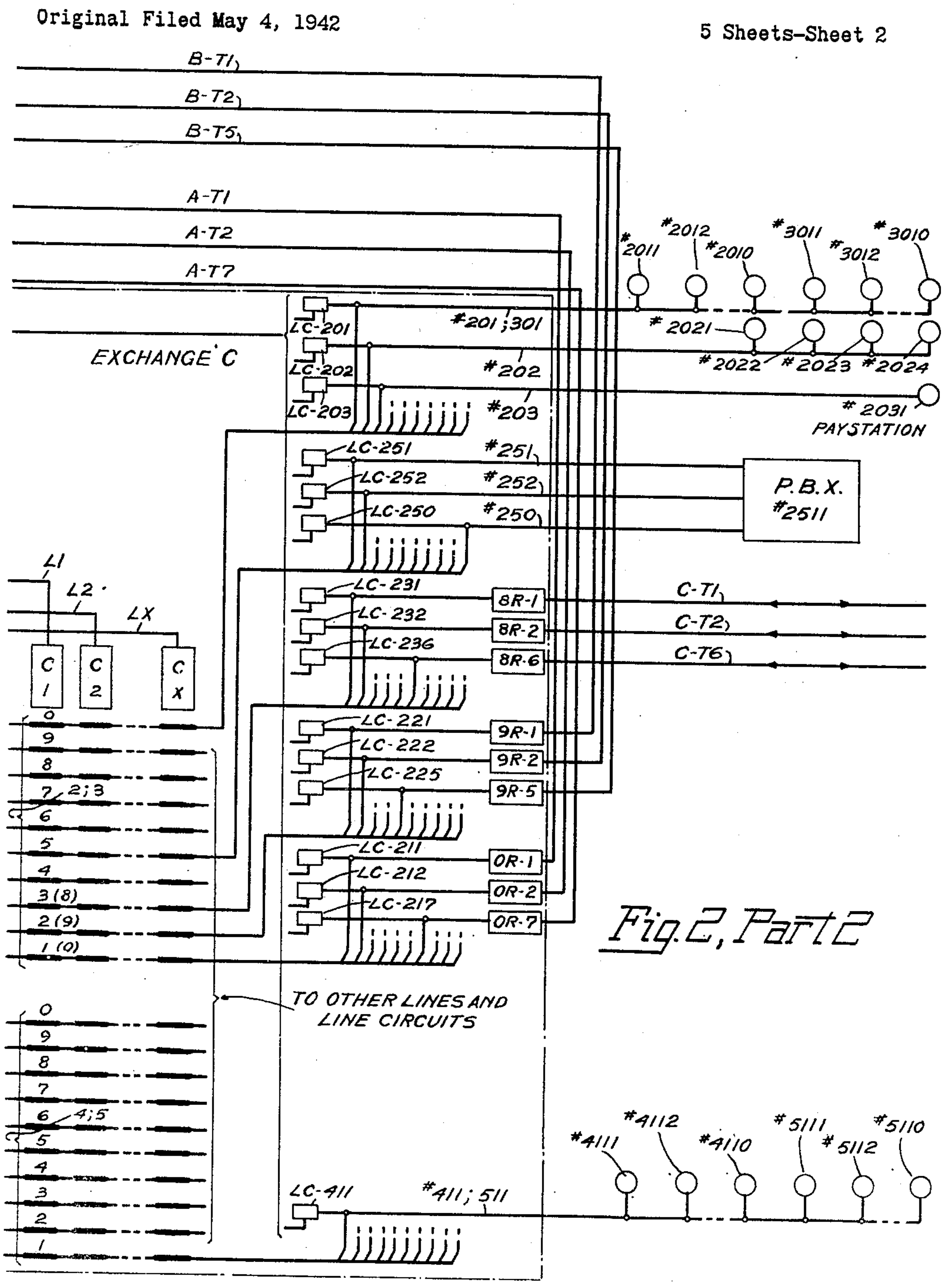
Fig. 2, Part 2
INVENTOR.
PIER BAKKER
BY C. P. Soper
ATTORNEY April 10, 1951 P. BAKKER 2,548,191
MULTIEXCHANGE AUTOMATIC TELEPHONE SYSTEM
Original Filed May 4, 1942 5 Sheets-Sheet 3
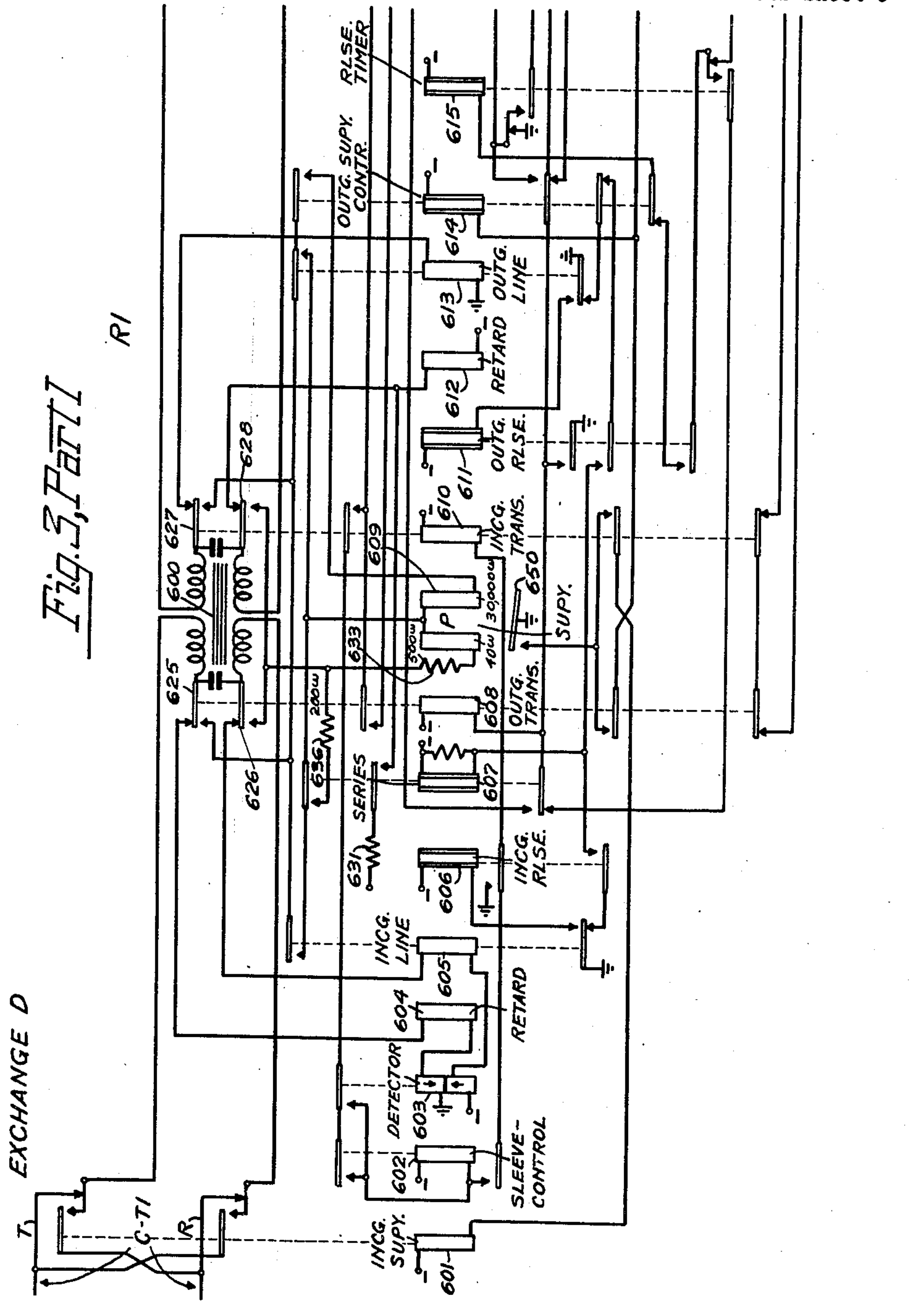
Fig. 3, Part I
INVENTOR.
PIER BAKKER
BY C. P. Soper
ATTORNEY April 10, 1951 P. BAKKER 2,548,191
MULTIEXCHANGE AUTOMATIC TELEPHONE SYSTEM
Original Filed May 4, 1942 5 Sheets-Sheet 4
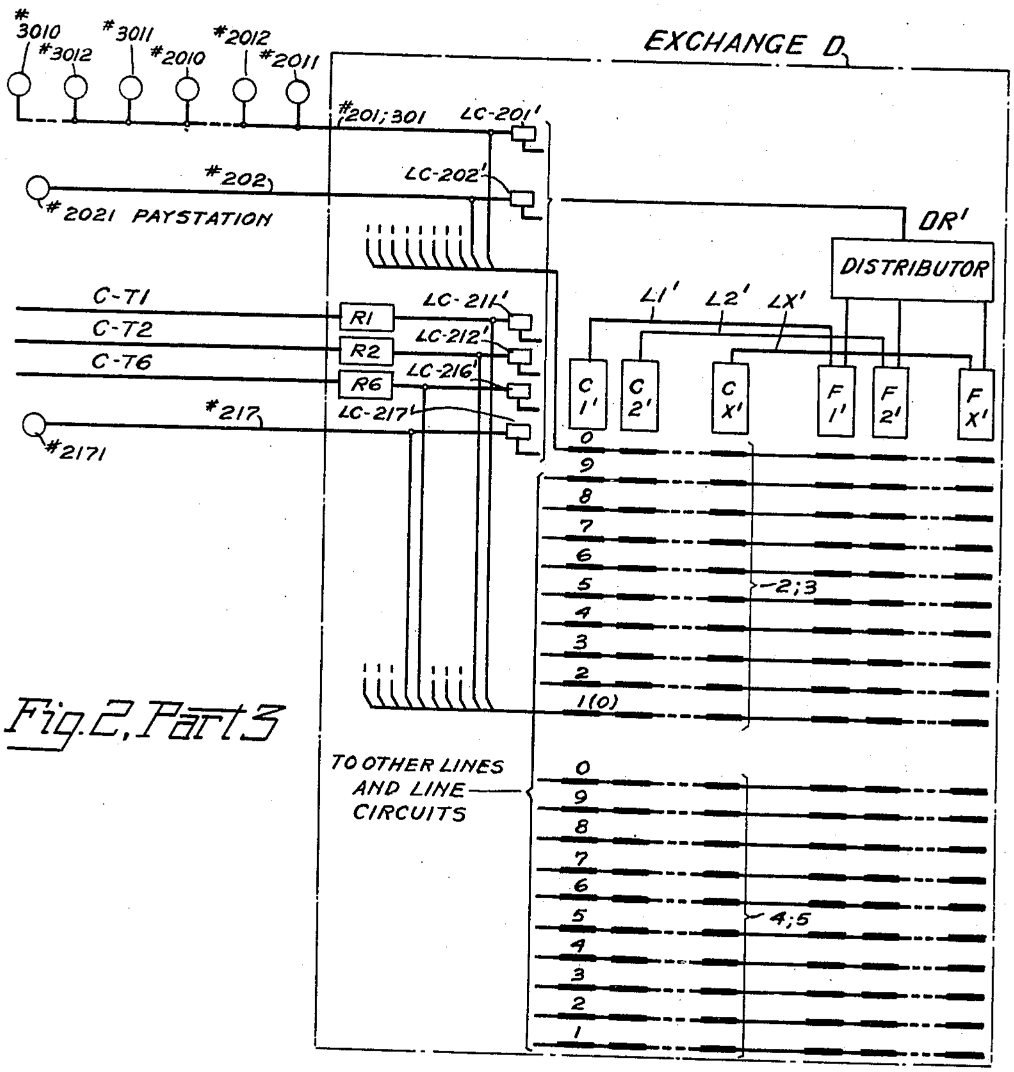
Fig. 2, Part 3
INVENTOR.
PIER BAKKER
BY C. P. Sofia[?]
ATTORNEY April 10, 1951 P. BAKKER 2,548,191
MULTIEXCHANGE AUTOMATIC TELEPHONE SYSTEM
Original Filed May 4, 1942 5 Sheets-Sheet 5
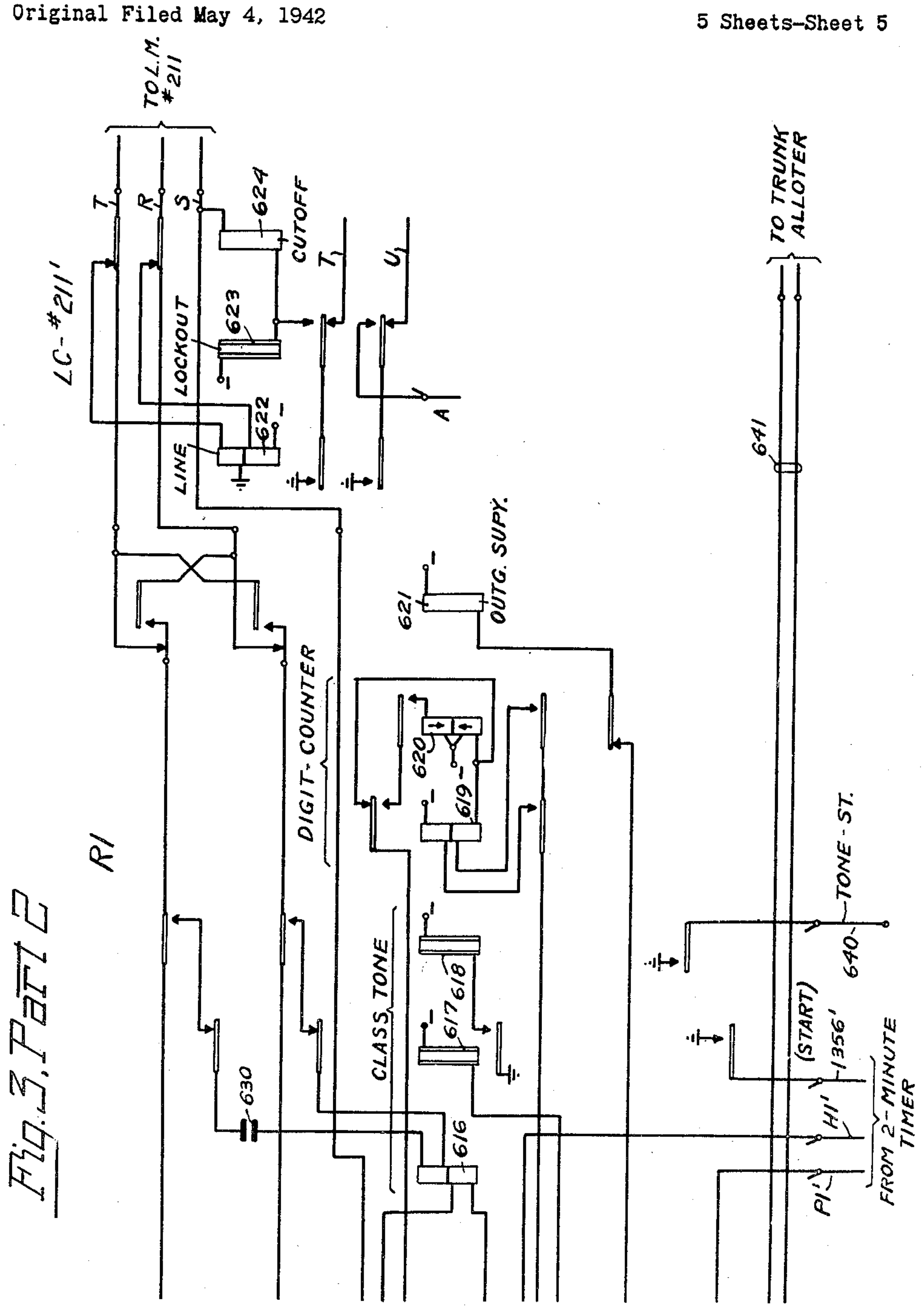
Fig. 3, Part 2
INVENTOR.
PIER BAKKER
BY C. P. Sofer
ATTORNEY Patented Apr. 10, 1951

2,548,191

UNITED STATES PATENT OFFICE 2,548,191

MULTIEXCHANGE AUTOMATIC TELEPHONE SYSTEM

Pier Bakker, Chicago, Ill., assignor to Kellogg Switchboard and Supply Company, Chicago, Ill., a corporation of Illinois Original application May 4, 1942, Serial No. 441,641, now Patent No. 2,427,650, dated September 23, 1947. Divided and this application October 26, 1945, Serial No. 624,783

6 Claims. (Cl. 179—7)

This invention relates to multi-exchange automatic telephone systems. Its main object is to provide new and improved circuit arrangements effective on interexchange calls to, or through, a tandem exchange to cause a charge to be assessed against the calling subscriber, or for permitting the call to be completed without charge, depending upon the destination of the call. This application is a division of my prior application for Multi-exchange community automatic telephone systems, Serial No. 441,641, filed May 4, 1942, now Patent No. 2,427,650, issued September 23, 1947.

GENERAL DESCRIPTION

As is explained in my parent application above referred to, the present invention is particularly suited for use in a so-called community automatic telephone system.

The term community automatic telephone system as used herein refers to an automatic telephone system arranged to provide telephone service in a small community, usually a town or village and its environs. A network of such exchanges may be provided by interconnecting two or more of them by trunk lines to enable subscribers of any such exchange to call those of the other exchanges.

Many problems are encountered in connection with community automatic exchanges which are not commonly met with in the larger automatic exchanges provided in cities. For example, the lines interconnecting a community automatic exchange with another exchange are usually so small in number that their efficient use requires each of them to be equipped for two-way operation, and to be equipped to furnish toll as well as local service. Moreover, the number of lines served by such an exchange is ordinarily so small (from a few dozen to two hundred, for example), and the offered traffic is consequently so small, that the efficient use of the connecting links requires that each of them be arranged to handle all classes of calls, including local subscriber-to-subscriber calls, interexchange subscriber-to-subscriber calls, originated and received toll calls, calls to single-party and multi-party lines, reverting calls, calls from pay-station lines, and calls to a P. B. X (private branch exchange).

The invention is disclosed as embodied in a multi-exchange network of community automatic exchanges, including at least two community automatic exchanges interconnected with each other by two-way trunk lines, one of the community automatic exchanges (termed the tandem exchange) being interconnected by two-way trunk lines with each of two manual exchanges.

In the parent application, the invention is further illustrated as applied to a switching arrangement wherein the connections are set up in a community automatic exchange through the medium of any one of a number of finder-connector links, each such link including relay switching mechanism comprising a finder having access to all the lines of the exchange, and other relay switching mechanism comprising a connector having access to all the lines of the exchange.

*The drawings*

The accompanying drawings, comprising Figs. 1 to 3, show a sufficient amount of the equipment in a telephone system embodying the features of the invention to enable the invention to be understood:

Fig. 1 shows the paths taken by the trunk lines interconnecting exchanges of the system;

Fig. 2 is a diagram showing the scheme of the arrangement in the exchanges of Fig. 1; and Fig. 3 shows the circuit arrangements of a two-way repeater in a terminating exchange of the system.

*The system*

As shown in Fig. 1, the system includes a pair of manual exchanges A and B and a pair of automatic exchanges C and D. The exchanges C and D are community automatic exchanges, each arranged to serve a separate community.

As indicated in Fig. 1, the community automatic exchanges C and D are interconnected by a group of two-way trunk lines. The digit 6 placed within the circle adjacent the line representing the group of two-way trunk lines is intended to indicate that there are six such trunk lines in the illustrated example. "#8" adjacent exchange C indicates that the C to D interexchange trunk-line group is reached in exchange C by the dialing of the digit 8, while "#0" adjacent exchange D indicates that the C to D interexchange trunk-line group is reached in exchange D in the illustrated example responsive to the dialing of the digit 0.

Similarly, it is indicated that there are seven two-way trunk lines interconnecting exchanges A and C, reached in exchange C responsive to the dialing of the digit 0, and that there are five two-way trunk lines interconnecting exchanges B and C, reached in the exchange C responsive to the dialing of the digit 9.

The arrangement illustrated in Fig. 1 is further intended to indicate that an operator at exchange A can extend connection to exchange B through the tandem automatic exchange C by taking an A-to-C trunk line for use and dialing the digit 9, while an operator at exchange B can similarly extend connection to exchange A by taking a B-to-C trunk line for use and dialing the digit 0. Fig. 1 is further intended to indicate that a subscriber of the terminating exchange D can reach manual exchange A by dialing the digits 0 and 0, and can reach the manual exchange B by dialing the digits 0 and 9.

Referring now to Fig. 2, comprising parts 1 to 3, the manual exchanges A and B of Fig. 1 are indicated by rectangles in the upper left-hand corner of part 1; the tandem community automatic exchange C is represented by the rectangle covering a portion of part 1 and a portion of part 2; and the terminating community automatic exchange D is represented by the rectangle in part 3 of Fig. 2.

*Manual exchange A*

The equipment in exchange A includes the jack J1, illustrative of the jacks through which the subscriber lines of exchange A are reached; the jack J2, illustrative of the jacks through which toll lines connected with exchange A are reached; the cord circuit CC1, and the jacks J3 to J5 which are three of the seven jacks representing the manual-exchange terminals of the seven associated interexchange trunk lines, of which trunk lines A—T1, A—T2, and A—T7 are indicated in Fig. 2.

The equipment in the manual exchange A further includes a trunk circuit interposed between each of the two-way interexchange trunk lines and the corresponding switchboard jack. The trunk circuits for the indicated trunk lines are respectively A—TC1, A—TC2, and A—TC7.

*Manual exchange B*

Similarly, the equipment in exchange B includes the subscriber-line jack J6, cord circuit CC2, trunk jacks J7 to J9, and trunk circuits B—TC1, B—TC2, and B—TC5.

*Tandem automatic exchange C*

As previously noted each of the community automatic exchanges includes finder-connector links each having a full capacity of two hundred line multiples. Finders F1, F2, and FX are indicated in exchange C, linked respectively to connectors C1, C2, and CX by the links L1, L2, and LX. The "X" designation with respect to the last link is used because the number of links required is indefinite, in that it depends on the traffic requirements of any specific installation.

The line multiples are divided into groups of ten multiples to the group, the tens groups being represented respectively by the twenty lines extending horizontally below the rectangles indicating the finders and connectors. These twenty horizontal lines thus indicate the full number of two hundred line multiples.

The tens subgroups of line multiples are sometimes referred to as "levels." Using this expression, each of the finders and connectors has twenty levels of contacts (ten sets of contacts to a level) and each of the short heavy horizontal lines below a finder or connector represents a separate one of such levels of contacts. In the relay type of switching mechanism illustrated in the parent application, each such level is represented by a separate gang relay carrying ten sets of contacts.

The upper set of levels of the finders and connectors comprises the first hundreds group and this hundreds group is reached as previously noted when either of the hundreds digits 2 and 3 is dialed. The lower set of levels comprises the second hundreds group, which, as previously noted, is reached when either of the hundreds digits 4 and 5 is dialed. The ten levels in each hundreds group have the tens digits 1 to 9 and 0 assigned respectively thereto, as is indicated below the finder F1 and below the connector C1.

Each of the line multiples has a line circuit connected thereto. The line circuits LC—211, LC—212, and LC—217, for example, are connected respectively with line multiples #211, #212, and #217, being line multiples 1, 2, and 7 in the first level of the uppermost hundreds group of the finders and connectors. All of these line circuits are identical, and each of them has a pair of individual "mark" conductors (a tens conductor and a units conductor). These mark conductors are indicated schematically in Fig. 2 by the short lines extending to the left from the bottom of the rectangles indicative of the line circuits. As indicated by the bracket and by the line extending therefrom to the distributor DR, such mark conductors extend to the distributor, and control the distributor so as to cause the currently allotted finder to be set on the individual multiple associated with the currently calling line.

The uppermost or 0 level of the "2" hundreds group of line multiples (the upper one in Fig. 2) in exchange C has line circuits LC—01 to LC—00 associated respectively with the ten multiples thereof, of which line circuits LC—201 to LC—203 are shown. The first multiple in this tens group is illustrated as serving the twenty-party line #201; 301. That is, the same line is reached responsive to the calling of either 201 or 301. When fully equipped, this party line has ten substations #2011 to #2010 and ten substations #3011 to #3010, a total of twenty substations. For convenience of illustration, only the first, second, and last substation in each tens group on the twenty-party line are shown.

Line #202, associated with the correspondingly numbered line multiple and with line circuit LC—202, is illustrated as a four-party line, such as may be used for residential party-line service within the town or village. The directory numbers of the substations on four-party line #202 may be #2021 to #2024.

Line multiple #203, associated with line circuit LC—203, is illustrated as serving pay-station line #203, having pay station #2031 thereon (the party digit 1 being added to the line designation of each individual line to make the directory numbers uniform in the number of contained digits).

The other line multiples of the above tens group may be arranged to serve either party lines or individual lines, and any station may or may not be a pay station, as desired. The same is true of the line multiples in the other tens groups.

The 5 level in the "2" hundreds group is illustrated as associated with ten P. B. X lines #251 to #250, extending to P. B. X #2511. The concerned multiples are associated respectively with line circuits such as LC—251, LC—252, and LC—250.

As will be hereinafter described, the arrangement is such that the first P. B. X line #251 is taken for use, if idle, when the P. B. X directory number 2511 is called. If the first line is busy, the first idle one of the subsequent lines is taken for use and the call is completed thereover, the connection being denied and the busy signal returned only in case all P. B. X lines are in use. On the other hand, if the number of any line in the P. B. X group other than that of the first line is called, connection is completed to the particular line called, if it is idle, but the connection is denied and a busy signal is returned if that line is busy.

It is to be noted that the levels 1, 2, and 3 of the "2" hundreds group in addition to the respective level designations, have the designations (0), (9), and (8) respectively applied thereto below the connectors. This is intended to indicate that, when the digit in parenthesis is called as a first digit, the connector in use operates as a single-digit connector to make connection with the first idle interexchange trunk line served by the level to which the dialed single-digit number is assigned. For example, it was pointed out in connection with Fig. 1 that the dialing of the single-digit number 0 in exchange C results in the extension of connection from exchange C to exchange A over an idle one of the seven two-way interexchange trunk lines between exchanges A and C. These seven trunk lines are served by the first seven line multiples in the first level of the "2" hundreds group in Fig. 2, these multiples having associated therewith line circuits such as LC—211, LC—212, and LC—217. The illustrated ones (A—T1, A—T2, and A—T7) of these seven trunk lines extend in exchange C respectively to the repeaters 0R—1, 0R—2, and 0R—7. The switchboard side of such of the repeaters 0R—1 to 0R—7 is connected respectively with the multiples associated with line circuits LC—211 to LC—217.

Similarly, the dialing of the digit 9 in exchange C causes the connector in use to extend connection by way of an idle one of the first five multiples in the second level of the "2" hundreds group, through one or another of the repeaters such as 9R—1 to 9R—5, and over a trunk line such as B—T1 to B—T5, to exchange B.

The dialing of the digit 8 in exchange C results in connection being extended by the connector in use through an idle one of the first six multiples in the third level of the "2" hundreds group, through one or another of the repeaters such as 8R—1 to 8R—6, and over one of the trunk lines C—T1 to C—T6, to exchange D.

One of the lines associated with the "4" hundreds group of line multiples is shown. This is the twenty-party line #411; 511, associated with line circuit LC—411 and the correspondingly numbered line multiple. This line may have ten substations #4111 to #4110 thereon indexed by the calling of the hundreds digit 4, and ten other substations #5111 to #5110 thereon indexed by the calling of the hundreds digit 5.

*Terminating automatic exchange D*

The arrangement of finder connector links, line multiples, and line circuits in exchange D is similar to that above described in exchange C. Connectors C1' to CX' are illustrated as linked respectively by links L1' to LX' with the finders F1' to FX', such finders being controlled by the distributor DR' under the control of the line circuits, such as LC—201', for example.

As indicated by the designation (0) applied to the first level of the "2" hundreds group in exchange D, such level is used, when the single-digit number 0 is dialed, to give access to the interexchange trunk lines C—T1 to C—T6, by way of the repeaters R1 to R6, the first six line multiples in this level being used for this purpose.

With respect to each of the exchanges C and D, it will be understood that in any level assigned to interexchange trunk lines, any line multiple not required for the interexchange trunk line group may be used for a subscriber line and called by the regular directory number assigned according to the position occupied by the concerned multiple. This is illustrated by line #217 of exchange D, serving individual-line substation #2171, connected to the seventh line multiple in the same tens subgroup serving the six interexchange trunk lines C—T1 to C—T6.

The other illustrated subscriber lines of exchange D are the twenty-party line #201; 301, and the pay-station line #202.

*The circuit drawings*

The circuit drawings shown in Fig. 3, parts 1 and 2, show the automatic to automatic repeater R1 (of Fig. 2, part 3), in terminating exchange D, interposed between the interexchange trunk line C—T1 and the line circuit LC—211' (of Fig. 2, part 3). These circuit drawings correspond to Fig. 6 of the parent application.

DETAILED DESCRIPTION

The system to which the invention is applied having been described generally, a detailed description of the operation of the system will now be given, so far as it directly concerns apparatus shown in Fig. 3.

A. *Local calls from tandem exchange C to terminating exchange D*

The handling of local calls from subscriber lines to tandem exchange C to lines of terminating exchange D will now be described. For this purpose, it may be assumed that a subscriber at pay station #2031 (Fig. 2, part 2) desires to converse with the subscriber at substation #2012 on party line #201; 301 of exchange D (Fig. 2, part 3).

It may be assumed that, when the receiver is removed at the calling pay station, operations occur as described in the parent application to extend the connection from the calling line through the finder F1 of Fig. 2, part 1, to the connector C1 of Fig. 2, part 2, whereupon the seized connector C1 is prepared for operation as explained in the parent application.

Since the calling subscriber is calling a line of another exchange, he first dials the single-digit number assigned to such other exchange (the digit 8 in the assumed example), after which he waits for dial-tone from the called exchange before calling the number (2012) of the desired subscriber in the called exchange.

When the digit 8 is dialed into the seized connector C1 as the initial digit, operations occur as described in the parent application to cause the connector to be set upon as idle one of the trunk lines (C—T1 to C—T6) interconnecting exchanges C and D. When this occurs, the connector "switches through" to extend the line multiple of the calling line directly to the local switchboard conductors extending to the repeater (8R—1 to 8R—6) associated with the idle trunk line.

It may be assumed that the trunk line C—T1 is seized, by way of repeater 8R—1. Thereupon, operations occur as described in the parent application to cause the conductors comprising trunk C—T1 to be bridged in the repeater 8R—1 of the calling exchange C.

A1. *Preparing repeater R1 for incoming operation*

In exchange D, retard coil 60 is connected between ground and the tip conductor of trunk line C—T1, through contacts 625 and the upper left-hand winding of repeating coil 600, while incoming line relay 605 is connected between the free pole of the exchange battery and the ring conductor of the trunk line, through contacts 626 and the lower left-hand repeating-coil winding. As a result, line relay 605 operates over the trunk line C—T1 when it is bridged as described in the repeater 8R—1. Incoming release relay 606 next operates through contacts of line relay 605, and operates incoming transfer relay 610.

Differential detector relay 603, whose windings are connected in series respectively with retard coil 602 and incoming line relay 605, is not operated at this time because the current flow is balanced in its two windings. Detector relay 603 is not operated at any time during a call of the class under consideration because of the operated condition of detector relay 503 in repeater 8R—1, which maintains its contacts open to avoid an unbalancing of the interexchange trunk-line conductors at the end of each dialing operation, as will be explained hereinafter.

A2. *Bridging the talking conductors of the line multiple*

At armatures 627 and 628, incoming transfer relay 610 disconnects retard coil 612 and outgoing line relay 613, and substitutes a bridge across the tip and ring conductors of the associated line multiple #211. This bridge may be traced from the front contact of armature 627, through the upper contacts of incoming line relay 605, the low-resistance left-hand winding of polarized relay 609, and resistor 633, to the front contact of armature 628.

A3. *Seizing a connector in exchange D*

In line circuit LC—211', line relay 622 now operates over the bridge established in repeater R1, and applies ground potential to the associated T and U marking conductors so as to cause the distributor DR—1' (Fig. 2, part 3) to operate an idle one of the associated finders to link a connector with the associated calling line multiple #211. It may be assumed that the finder F1' is idle and is accordingly operated by the distributor DR' to link the connector C1' with the calling line multiple #211 through the finder-connector link L1'. This operation is as described in the parent application in connection with the corresponding apparatus of exchange C shown in Figs. 11 to 13 therein.

When the connector C1' has been taken for use and prepared for operation, it returns a dial-tone signal over the established connection as explained in the parent application for the connector C1 of Fig. 13 therein. Upon hearing the dial-tone signal, the calling subscriber at pay station #2031 (Fig. 10) in exchange C dials the digits 2, 0, 1, and 2 in the desired exchange-D number.

A4. *Repeating the digit impulses from exchange C to exchange D*

Each time a digit of the desired number is called, the line relay (not shown herein) of repeater SR—1 (Fig. 2) is restored momentarily a corresponding number of times. Upon each such momentary restoration, the previously noted bridge across the conductors of trunk line C—T1 is opened, producing a momentary restoration of incoming line relay 605 of the repeater R1.

In the repeater R1, upon the first restoration of incoming line relay 605 of any series, a circuit is closed through contacts of slow-restoring release relay 606 for slow-restoring series relay 607. Relay 607 accordingly operates and remains operated throughout the series of impulses. At the upper contacts of series relay 607, resistor 602 is shunted around resistor 633 and the left-hand winding of relay 609 to improve the impulsing circuit to the connector in use.

Upon each momentary restoration of line relay 605, the bridge across the conductors of the associated line multiple #211 are opened at the upper contacts thereof, thus effectively repeating the dialed impulses to the connector C1' (Fig. 2, part 3).

A5. *Completing the connection by local-connector operation in exchange D*

The connector C1' responds (as hereinbefore described for the connector C1, Fig. 13) to the digits repeated thereto at the repeater R1 to complete connection to the called substation #2012 on party line #201; 301. Assuming that this line is idle, the connection is made and ringing current is applied. In the call under consideration, detector relay 603 of repeater R1 not having operated, sleeve-control relay 602 is consequently not operated, and no ground potential therefore is applied by repeater R1 to the sleeve conductor of the associated multiple #211. As a result, the connector in use (connector C1', Fig. 2, part 3) changes over from toll operation to local operation, as described in the parent application, for the connector C1, Fig. 13 therein.

A6. *Answered supervision*

When the called subscriber answers, connector C1' operates to cause the current flow to be reversed over its incoming conductors, whereby the current flow in the tip and ring conductors of line multiple #211 associated with the repeater R1 is reversed. When this occurs, polarized supervisory relay 609 in the repeater R1 operates, whereupon incoming supervisory relay 601 is operated through contacts of incoming transfer relay 610 to reverse the conductors of the trunk line C—T1.

In repeater 8R—1, the polarized supervisory relay (not shown herein) now operates to cause reversal of the tip and ring conductors of the associated line multiple #231. The current flow in the calling pay-station line of Fig. 10 is thereby reversed, rendering the pay-station instrument inoperative, as described in the parent application, until the subscriber deposits the requisite coin to thereby again render it operative for conversational purposes.

A7. *Disconnect supervision*

If the called subscriber replaces his receiver first, the current flow is reversed back to normal direction in the connector in use in exchange B, whereupon relays 609 and 601 in repeater R1 restore, causing the repeater 8R–1 to reverse the current flow in the calling line back to normal direction.

A8. *Clearing out*

When the receiver is replaced at the calling substation, the established connection clears out as will now be explained.

The line relay (not shown) of repeater 8R—1 restores when the receiver is replaced at the calling substation. It open-circuits and restores the distant line relay 605, at the same time initiating the clearing-out operation in the calling exchange.

In the called exchange D, when line relay 605 is open-circuited and restored as above mentioned, it unbridges the tip and ring conductors of the associated line multiple #211 at its upper contacts to permit the connector in use to clear out, while at its lower contacts it open-circuits incoming release relay 606. Release relay 606 restores a moment later, permitting incoming transfer relay 610 to restore. Series relay 607 operates incidentally at this time, but clears out following the restoration of relay 606.

The remaining portion of the connection, including the connector in use, is cleared out as hereinbefore described in connection with the connector C1 (Fig. 13). When this occurs, cutoff and lockout relays 624 and 623 of line circuit LC—211' restore, returning the line circuit to its illustrated normal condition.

B. *Manual-exchange calls through tandem exchange C to terminating exchange D*

The handling of manual-exchange calls through tandem exchange C to lines of terminating exchange D will now be described. For this purpose, it may be assumed that the operator at exchange A receives a call for a subscriber of terminating exchange D. It may be assumed that the trunk line A—T1 (Figs. 7 and 8), associated with trunk circuit A—TC1 and repeater 0R—1, is used for this call.

B1. *Seizing and preparing a connector in tandem exchange C*

When a cord-circuit plug is inserted into the jack J3 (Fig. 7), operations as described in the parent application occur, causing a finder in exchange C to connect with the calling trunk line A—T1. It may be assumed that finder F1 of Fig. 11 responds at this time to extend the call over the associated link L1 to the connector C1. The connector C1 is thereupon prepared for operation as described in the parent application, and returns a dial-tone signal to the calling manual exchange.

B2. *Dialing the single-digit number of exchange D*

The calling operator now dials the digit 8 assigned to the terminating exchange, causing the connector C1 to be operated to take an idle one of the concerned trunk lines for use as described in the parent application.

B3. *Seizing repeater 8R—1*

It may be assumed that the trunk line C—T1 is idle and allotted at this time, in which case the connection is extended through line multiple #231 to the repeater 8R—1.

B4. *Preparing repeater 8R—1 for outgoing toll operation*

The seized repeater 8R—1 is now prepared for outgoing toll operation as explained in the parent application, and is thereby prepared to condition repeater R1 subsequently for toll operation, as will be described hereinafter.

B5. *Preparing repeater R1 for incoming operation*

In exchange D, the repeater R1 is prepared for incoming operation as hereinbefore described by the operation of line relay 605, release relay 606, and incoming transfer relay 610. The line circuit LC—211 now operates as described to cause an idle connector to be linked to the associated line multiple #211, whereupon dial-tone signal is transmitted back over the connection to the calling operator to inform her that she may dial the listed directory number of the desired subscriber in terminating exchange D.

B6. *Repeating the digit impulses through tandem exchange C to terminating exchange D*

As explained in the parent application, the impulse series constituting the digits in the desired number are repeated, through repeaters 0R—1 and 8R—1 to line relay 605 of the repeater R1, which in turn repeats them at its upper contacts to the connector in use in exchange D.

B7. *Relaying the grounded-sleeve, toll-call indication from exchange C to exchange D*

As explained in the parent application, with repeater 8R—1 conditioned for toll operation, it momentarily unbalances the current flow in the conductors of trunk line C—T1 at the end of each digit series, thus unbalancing the current flow in the two windings of differential-detector relay 603.

B7a. *Conditioning repeater R1 for toll operation*

In the exchange D, detector relay 603 of repeater R1 now operates to close a circuit for sleeve-control relay 602 from ground on the sleeve conductor of the associated line multiple #211, through the inner upper contacts of the operated incoming transfer relay 610 and contacts of detector relay 603. Sleeve-control relay 602 now operates. At its upper contacts, it locks itself to the associated sleeve conductor, independent of the contacts of detector relay 603. At its lower contacts, relay 602 completes a ground connection to the sleeve conductor of the associated line multiple #211 as follows: from ground through the inner lower contacts of the operated incoming release relay 606, through the lower contacts of sleeve-control relay 602, the upper contacts of relay 602, and through contacts of relay 610 to the said sleeve conductor. The ground potential is thus applied to the sleeve conductor of line multiple #211 to mark the call as one coming from a manual exchange.

When the above-described temporary unbalanced condition is terminated, detector relay 603 restores, but sleeve-control relay 602 remains operated thereafter through its own contacts independent of the contacts of detector relay 603.

The unbalancing operation is repeated at the end of each dialed digit, but is of no particular effect after sleeve-control relay 602 has operated and locked as above noted.

B8. *Conditioning the connector in use in exchange D for toll operation*

As explained in the parent application, when the complete number has been dialed and the connector in use in exchange D tests the called line and operates either its busy relay or its switching relay, the test winding of the detector relay therein (not shown herein) is cut into circuit, but such detector relay is prevented from operating at this time by the ground potential maintained on the sleeve conductor of the connection in exchange D by the above-mentioned ground connection to the sleeve conductor S of the calling line multiple #211 associated with the repeater R1. Accordingly, the connector in use in exchange D is conditioned for toll operation by the failure of the above-mentioned detector relay to operate.

B9. *Answered supervision*

Assuming that the called line is idle and that the called subscriber responds, the consequent reversal of current flow brought about by the connector in use causes supervisory relays 609 and 601 in the repeater R1 to respond to reverse the current flow over trunk line C—T1, as previously described, causing repeater 8R—1 and 0R—1 to respond successively, thereby causing the calling operator to be given answered supervision.

B10. *Disconnect and recall supervision*

The above-mentioned supervisory operations are reversed when the called subscriber replaces his receiver. The called subscriber can, of course, signal the operator by manipulating his hookswitch as desired, the hookswitch signaling being repeated from repeater R1 to repeater 8R—1, and from the repeater 8R—1 to the repeater 0R—1, and from the repeater 0R—1 to the trunk circuit A—TC1.

B11. *Clearing out*

When the operator at exchange A removes her plug from the jack J3, the resulting open-circuit condition is relayed by the repeater 0R—1 to the repeater 8R—1, thereby to the repeater R1, and thereby to connector in use in the terminating exchange D. The connection in tandem exchange A is cleared out responsive to the removal of ground potential from the sleeve conductor of line multiple #211 associated with repeater 0R—1 or to the removal of ground potential from the sleeve conductor of line multiple #231 associated with the repeater 8R—1, whichever occurs last.

In the exchange D, the connector in use removes ground potential at one point from the sleeve lead of line multiple #211, Fig. 6, part 2, when it clears out. Incoming release relay 606 of repeater R1 restores as a result of the deenergization of incoming line relay 605. When it does so, it removes ground potential at one point from the sleeve conductor of the associated line multiple #211. Responsive to whichever of these operations occurs last, line circuit LC—211′ clears out, and relays 602 and 610 restore.

C. *Local call from terminating exchange D to tandem exchange C*

The way in which subscribers of terminating exchange D are given service on calls to subscriber lines of tandem exchange C will now be described. For this purpose, it may be assumed that a subscriber at pay station #2021 (Fig. 2, part 2) on line #202 of exchange D desires to converse with a subscriber of tandem exchange C.

C1. *Seizing a connector in exchange D*

When the receiver is removed at the calling pay station, a finder such as F1′ (Fig. 2, part 3) is caused to operate to link a connector such as C1′ with the calling line, whereupon such connector is prepared for operation and a dial-tone signal is given to the calling subscriber.

C2. *Dialing the single-digit number of exchange C*

The calling subscriber may now dial the digit 0 assigned to tandem exchange C from the standpoint of terminating exchange D, with the result that the connector in use is operated as hereinbefore described for connector C1 (Fig. 13) to make connection with an idle one of the trunk lines interconnecting exchanges C and D. It may be assumed that the trunk line C—T1 interconnecting the repeaters 8R—1 and R1 of Figs. 5 and 6 is idle and allotted at this time, in which case it is taken for use by way of line multiple L. M. #211 (Fig. 6, part 2).

C3. *Clearing the line circuit LC—211′*

When the connector in use in exchange D seizes line multiple #211 therein, associated with repeater R1, Fig. 6, it thereby extends the conductors of the calling line to the tip and ring conductors T and R of the seized line multiple, and extends the still-grounded sleeve conductor of the connection to the sleeve conductor S of the line multiple. Cutoff and lockout relays 624 and 623 are thereupon operated over the associated sleeve conductors to clear the line circuit LC—211′.

C4. *Preparing repeater R1 for outgoing operation*

In the repeater R1, retard coil 612 is normally connected between the free pole of the exchange battery and the ring conductor of the associated line multiple through contacts 628 of incoming transfer relay 610 and the lower left-hand winding of repeating coil 600, while outgoing line relay 613 is normally connected between ground and the tip conductor of the line multiple through contacts 627 and the upper right-hand winding of the repeating coil. Consequently, outgoing line relay 613 is energized over the calling line when the associated line multiple #211 is seized. Relay 613 thereupon operates causing the successive operation of outgoing release relay 611 and outgoing transfer relay 608. Outgoing transfer relay 608 applies a holding ground potential to the sleeve conductor of the associated line multiple as follows: from ground, through normally closed contacts controlled by inner armature of release-timer relay 615, the lower winding of transformer 616, and through the inner upper contacts of outgoing transfer relay 608, to the associated sleeve conductor.

With outgoing release relay 611 operated, class-tone relay 617 operates through contacts of outgoing supervisory-control relay 614, followed by the operation of class-tone relay 618, to prepare for the giving of a class-tone signal when the call is answered, which signal is important only when a manual exchange is being called.

At armatures 625 and 626, outgoing transfer relay 608 disconnects the conductors of trunk line C—T1 from retard coil 602 and incoming line relay 605 and transfers them to a bridge controlled by the upper contacts of outgoing line relay 613. This bridge may be traced from the front contact of armature 625, through the upper contacts of outgoing line relay 613, the low resistance left-hand winding of polarized supervisory relay 609, and through resistor 633, to the front contact of armature 626.

C5. *Seizing a connector in exchange C*

Responsive to the closure of the above-traced bridge across the conductors of trunk line C—T1, the repeater 8R—1 in exchange C operates as described in the parent application to cause an idle finder to link its associated connector to the connection. Such connector is thereby prepared for operation.

The usual dial-tone signal is sent back by the seized connector in exchange C through the repeaters 8R—1 and R1 to the calling line in terminating exchange D to inform the calling paystation subscriber that he may now dial the directory number of the desired subscriber in the called tandem exchange C.

C6. *Repeating the digit impulses*

Upon dialing of each of the four digits in the directory number of the called line in exchange C, outgoing line relay 613 of repeater R1 is momentarily restored a number of times corresponding to the value of the digit. Each time it restores, it opens the above-traced bridge across the conductors of trunk line C—T1 at its upper contacts, whereby the calling-device impulses are repeated to the seized connector by way of repeater 8R—1, causing such connector to operate as described in the parent application to set up the desired connection.

In the repeater R1, each momentary restoration of outgoing line relay 613 closes a circuit for series relay 607 through contacts of outgoing supervisory relay 514 and contacts of the operated outgoing release relay 511. Relay 607 accordingly operates and remains operated throughout the series of impulses. At its inner upper contacts, it shunts resistor 631 around the winding of retard coil 612 to improve the response of line relay 613, while at its upper contacts it shunts resistor 632 across resistor 633 and the left-hand winding of relay 609, to improve the response of incoming line relay 514 of the repeater 8R—1.

C7. *Counting the number of digits to determine destination of the call*

Arrangements are provided in the repeater R1 to count the number of digits dialed by a calling exchange-D subscriber after seizure of the repeater to determine thereby whether the call is being made to one of the manual exchanges (in which case only a single digit, 9 or 0 is dialed) or is for a local line of exchange C (in which case four digits are dialed). The purpose of the determination is to enable reverse battery supervision received by the repeater R1 when the call is answered to be relayed back to the calling line if the call is to a subscriber line of exchange C, but to be withheld in the repeater R1 if the call is to one of the manual exchanges, whereby calling pay-station subscribers of exchange D are permitted to make free calls to the manual exchanges, but are required to deposit a coin before being permitted to converse with called subscribers of exchange C.

C7a. *Disconnecting the outgoing supervisory relay when the first digit is counted*

The digit-counting operation is accomplished by digit-counter relays 619 and 620 under the control of series relay 607.

When relay 607 operates as described in response to the first repeated digit, it closes a circuit for the lower winding of digit-counter relay 620, as follows: from ground through the inner lower contacts of the operated outgoing release relay 611, lower armature and front contact of series relay 607, upper armature and back contact of digit-counter relay 619, and thence to battery through the lower winding of relay 620. Relay 620 operates when this circuit is closed. At its lower contacts, it disconnects outgoing supervisory relay 621 so as to prevent the relaying back of reverse battery supervision unless relay 620 is subsequently restored. At its upper contacts, relay 620 prepares a restoring circuit for its upper winding, and at its inner lower contacts it closes a self-locking circuit, as follows: from ground through the lower contacts of relay 611, the inner lower contacts of relay 620, the lower winding of relay 619, and through the lower winding of relay 620 to battery. The lower winding of relay 619 is not energized in this locking circuit for the time being, for it is short-circuited by the initial circuit closed for the lower winding of relay 620.

When slow-restoring series relay 607 falls back at the end of the first digit dialed following the seizure of the repeater R, it opens the initial circuit above traced for the lower winding of relay 620. Relay 620 remains operated in its above traced locking circuit and relay 619 operates therein. Upon operating, relay 619 closes a locking circuit for its upper winding, to ground through the inner lower contacts of release relay 611, whereby it is maintained operated independent of the contacts of relay 620 until the connection is cleared out.

At its upper armature, relay 619 opens a further point in the previously established initial circuit for the lower winding of relay 620 and prepares a restoring circuit for the upper winding of relay 620.

On calls to the manual exchange, the single digit dialed after the seizure of the repeater R suffices to fully extend the connection, and relay 620 is, therefore, not restored by further dialing. On such calls, outgoing supervisory relay 621 remains disconnected. In the present example, however, the call is for a subscriber line of the tandem exchange and three additional digits are dialed, causing relay 620 to restore, as will be described, to again connect up outgoing supervisory relay 621.

C7b. *Reconnecting the supervisory relay when more than one digit is counted*

When the second digit in the desired number is dialed, series relay 607 is again operated and remains operated throughout the digit. At its lower armature and front contact, it closes a circuit through the inner contacts of the operated relays 619 and 620 for the upper winding of relay 620. Relay 620 is a differential relay, as indicated. As a result, relay 620 is deenergized by the current flow in its upper winding, and it accordingly restores. Upon restoring, relay 620 again connects up outgoing supervisory relay 621 at its lower contacts; it disconnects its upper winding at its upper contacts; and at its inner lower contacts, it opens the locking circuit through the lower windings of relays 619 and 620. Relay 619, however, remains operated through its own lower contacts and upper winding.

With relay 619 locked operated, and with relay 620 again restored, these relays are not affected by the further operations of series relay 607 during the dialing of the remaining two digits in the number.

C8. *Answered supervision*

When the called subscriber responds, the connector in use in exchange C reverses the current flow to repeater 8R—1, which thereupon reverses the conductors of trunk line C—T1, reversing the current flow through the left-hand winding of polarized relay 609 in the repeater R1. Relay 609 thereupon operates its armature 650, closing a circuit, through contacts of outgoing transfer relay 608, and contacts of the restored digit-counter relay 620, for outgoing supervisory relay 621. Relay 621 operates to reverse the current flow over the tip and ring conductors of the associated line multiple #211, thereby reversing current flow over the calling pay-station line #202 (Fig. 2, part 3). The calling pay-station #2021 is thereupon disabled by the operation of the polarized pay-station magnet as described in the parent application in connection with pay station #2031. The calling pay-station subscriber is thus required to deposit a coin to recondition the pay station for conversation.

C9. *Disconnect supervision*

Assuming that the called subscriber is the first to replace his receiver after conversation, the above described supervisory operations are reversed, returning the current flow in the calling line in exchange D to normal direction.

C10. *Clearing out*

When the receiver is replaced at the calling substation, the resulting open-circuit condition is relayed by repeater R1 of Fig. 6 to repeater 8R—1, and thence to the connector in use in exchange C, permitting such repeater and connector to clear out as described in the parent application.

In the calling exchange D, outgoing release relay 611 restores a slight interval after the restoration of outgoing line relay 613. At its inner contacts, relay 611 open-circuits and restores outgoing transfer relay 633 and digit-counter relay 619. Outgoing transfer relay 633, at its inner contacts, removes ground potential from the associated sleeve conductor, thereby permitting the line circuit LC—211' to clear out along with the connector in use and the calling line circuit. Series relay 607 is operated momentarily upon the restoration of line relay 612 but clears out responsive to the restoration of release relay 611 without producing any particular result at this time.

D. *Handling calls from terminating exchange D to manual exchanges A and B*

The handling of calls from terminating exchange D, through tandem exchange C, to manual exchanges A and B will now be described. For this purpose, it may be assumed that a subscriber at pay station #2021 (Fig. 2, part 3) desires to make a call to or through one of the manual exchanges A and B, manual exchange A, for example.

D1. *Calling tandem exchange C*

When the receiver is removed at pay station #2021, an idle one of the connectors C1' to CX' is linked to the calling line #202 by operation of the associated one of the finders F1' to FX' under the control of the distributor DR' as hereinbefore described. Such connector thereupon returns a dial-tone signal to the calling pay station line, and it responds to the digit 0, when dialed, to extend connection to tandem exchange C over an idle one of the interexchange trunk lines C—T1 to C—T6. It may be assumed that trunk line C—T1 is idle and allotted at this time and is therefore seized, by way of repeater R1 of Figs. 2 and 6.

When the repeater R1 is seized in the terminating exchange D, it is prepared for outgoing operation as hereinbefore described, its relays 613, 611, 608, 617, and 618 operating.

The repeater 8R—1 in exchange C is now prepared for operation responsive to the bridging of the associated trunk line C—T1 in the repeater R1 as hereinbefore described.

An idle connector in tandem exchange C is now linked to the associated line multiple #231 by finder operation. It may be assumed that the finder F1 operates to link the connector C1 to the calling multiple #231. The connector C1 is thereupon prepared for operation.

D2. *Calling manual exchange A*

When the calling subscriber in exchange D, on hearing the dial-tone signal now sent back from the connector C1 in exchange C, dials the digit 0 assigned to the manual exchange A from the standpoint of exchange C, the ten momentary interruption impulses constituting such digit are repeated by the repeater R1 of Fig. 6 to the repeater 8R—1, and are thereat repeated to the seized connector C1. As a result, the connector C1 operates as described in the parent application to cause connection to be made with the called manual exchange A, by way of the trunk line A—T1 for example. This connection is made by way of line multiple #211 and the repeater 0R—1.

As explained in the parent application, ringing current is now sent momentarily over the trunk line A—T1 to signal the operator in exchange A.

D3. *Answered supervision*

When the operator in the called manual exchange A answers a call, operations occur, as described in the parent application, in repeaters 0R—1 and 8R—1 to reverse the direction of current flow over the trunk line C—T1, to relay answered supervision to the repeater R1 in exchange D.

In the repeater R1, polarized supervisory relay 609 now responds and operates outgoing supervisory-control relay 614.

D3a. *Barring current reversal at repeater R1*

Outgoing supervisory relay 621 is not operated at this time because it is maintained disconnected at the lower contacts of the operated digit-counter relay 620, relay 620 not having been restored in the present call, because only a single digit was dialed, following the seizure of the repeater R1, to extend connection to the called manual exchange. The current flow is, therefore, not reversed in the calling pay-station line, wherefore the calling pay-station subscriber is able to carry on a conversation with the operator in the manual exchange without first depositing a coin, as he is obliged to do before conversing when a subscriber of either of the automatic exchanges is called.

Upon operating as above noted, outgoing supervisory-control relay 614 disconnects series relay 607 at its middle lower contacts; at its upper contacts, it closes a parallel bridge across the conductors of truck line C—T1 including the 30,000-ohm right-hand winding of polarized supervisory relay 609, for a purpose to be subsequently brought out; and at the back contact of its inner lower armature, it disconnects class-tone relay 617.

D3b. *Class-tone signaling at repeater R1*

Class-tone relays 617 and 618, both of which are slow-restoring relays as indicated, now restore successively. During the time required for idle finder to link its associated connector to the connection. Such connector is thereby prepared for operation.

The usual dial-tone signal is sent back by the seized connector in exchange C through the repeaters 8R—1 and R1 to the calling line in terminating exchange D to inform the calling pay-station subscriber that he may now dial the directory number of the desired subscriber in the called tandem exchange C.

C6. *Repeating the digit impulses.*

Upon dialing of each of the four digits in the directory number of the called line in exchange C, outgoing line relay 613 of repeater R1 is momentarily restored a number of times corresponding to the value of the digit. Each time it restores, it opens the above-traced bridge across the conductors of trunk line C—T1 at its upper contacts, whereby the calling-device impulses are repeated to the seized connector by way of repeater 8R—1, causing such connector to operate as described in the parent application to set up the desired connection.

In the repeater R1, each momentary restoration of outgoing line relay 613 closes a circuit for series relay 607 through contacts of outgoing supervisory relay 514 and contacts of the operated outgoing release relay 511. Relay 607 accordingly operates and remains operated throughout the series of impulses. At its inner upper contacts, it shunts resistor 631 around the winding of retard coil 612 to improve the response of line relay 613, while at its upper contacts it shunts resistor 632 across resistor 633 and the left-hand winding of relay 609, to improve the response of incoming line relay 514 of the repeater 8R—1.

C7. *Counting the number of digits to determine destination of the call*

Arrangements are provided in the repeater R1 to count the number of digits dialed by a calling exchange-D subscriber after seizure of the repeater to determine thereby whether the call is being made to one of the manual exchanges (in which case only a single digit, 9 or 0 is dialed) or is for a local line of exchange C (in which case four digits are dialed). The purpose of the determination is to enable reverse battery supervision received by the repeater R1 when the call is answered to be relayed back to the calling line if the call is to a subscriber line of exchange C, but to be withheld in the repeater R1 if the call is to one of the manual exchanges, whereby calling pay-station subscribers of exchange D are permitted to make free calls to the manual exchanges, but are required to deposit a coin before being permitted to converse with called subscribers of exchange C.

C7a. *Disconnecting the outgoing supervisory relay when the first digit is counted*

The digit-counting operation is accomplished by digit-counter relays 619 and 620 under the control of series relay 607.

When relay 607 operates as described in response to the first repeated digit, it closes a circuit for the lower winding of digit-counter relay 620, as follows: from ground through the inner lower contacts of the operated outgoing release relay 611, lower armature and front contact of series relay 607, upper armature and back contact of digit-counter relay 619, and thence to battery through the lower winding of relay 620. Relay 620 operates when this circuit is closed. At its lower contacts it disconnects outgoing supervisory relay 621 so as to prevent the relaying back of reverse battery supervision unless relay 620 is subsequently restored. At its upper contacts, relay 620 prepares a restoring circuit for its upper winding, and at its inner lower contacts it closes a self-locking circuit, as follows: from ground through the lower contacts of relay 611, the inner lower contacts of relay 620, the lower winding of relay 619, and through the lower winding of relay 620 to battery. The lower winding of relay 619 is not energized in this locking circuit for the time being, for it is short-circuited by the initial circuit closed for the lower winding of relay 620.

When slow-restoring series relay 607 falls back at the end of the first digit dialed following the seizure of the repeater R, it opens the initial circuit above traced for the lower winding of relay 620. Relay 620 remains operated in its above traced locking circuit and relay 619 operates therein. Upon operating, relay 619 closes a locking circuit for its upper winding, to ground through the inner lower contacts of release relay 611, whereby it is maintained operated independent of the contacts of relay 620 until the connection is cleared out.

At its upper armature, relay 619 opens a further point in the previously established initial circuit for the lower winding of relay 620 and prepares a restoring circuit for the upper winding of relay 620.

On calls to the manual exchange, the single digit dialed after the seizure of the repeater R suffices to fully extend the connection, and relay 620 is, therefore, not restored by further dialing. On such calls, outgoing supervisory relay 621 remains disconnected. In the present example, however, the call is for a subscriber line of the tandem exchange and three additional digits are dialed, causing relay 620 to restore, as will be described, to again connect up outgoing supervisory relay 621.

C7b. *Reconnecting the supervisory relay when more than one digit is counted*

When the second digit in the desired number is dialed, series relay 607 is again operated and remains operated throughout the digit. At its lower armature and front contact, it closes a circuit through the inner contacts of the operated relays 619 and 620 for the upper winding of relay 620. Relay 620 is a differential relay, as indicated. As a result, relay 620 is deenergized by the current flow in its upper winding, and it accordingly restores. Upon restoring, relay 620 again connects up outgoing supervisory relay 621 at its lower contacts; it disconnects its upper winding at its upper contacts; and at its inner lower contacts, it opens the locking circuit through the lower windings of relays 619 and 620. Relay 619, however, remains operated through its own lower contacts and upper winding.

With relay 619 locked operated, and with relay 620 again restored, these relays are not affected by the further operations of series relay 607 during the dialing of the remaining two digits in the number.

C8. *Answered supervision*

When the called subscriber responds, the connector in use in exchange C reverses the current flow to repeater 8R—1, which thereupon reverses the conductors of trunk line C—T1, reversing the current flow through the left-hand winding of polarized relay 609 in the repeater R1. Relay 609 thereupon operates its armature 650, closing a circuit, through contacts of outgoing transfer relay 608, and contacts of the restored digit-counter relay 620, for outgoing supervisory relay 621. Relay 621 operates to reverse the current flow over the tip and ring conductors of the associated line multiple #211, thereby reversing current flow over the calling pay-station line #202 (Fig. 2, part 3). The calling pay-station #2021 is thereupon disabled by the operation of the polarized pay-station magnet as described in the parent application in connection with pay station #2031. The calling pay-station subscriber is thus required to deposit a coin to recondition the pay station for conversation.

C9. *Disconnect supervision*

Assuming that the called subscriber is the first to replace his receiver after conversation, the above described supervisory operations are reversed, returning the current flow in the calling line in exchange D to normal direction.

C10. *Clearing out*

When the receiver is replaced at the calling substation, the resulting open-circuit condition is relayed by repeater R1 of Fig. 6 to repeater 8R—1, and thence to the connector in use in exchange C, permitting such repeater and connector to clear out as described in the parent application.

In the calling exchange D, outgoing release relay 611 restores a slight interval after the restoration of outgoing line relay 613. At its inner contacts, relay 611 open-circuits and restores outgoing transfer relay 633 and digit-counter relay 619. Outgoing transfer relay 633, at its inner contacts, removes ground potential from the associated sleeve conductor, thereby permitting the line circuit LC—211' to clear out along with the connector in use and the calling line circuit. Series relay 607 is operated momentarily upon the restoration of line relay 612 but clears out responsive to the restoration of release relay 611 without producing any particular result at this time.

D. *Handling calls from terminating exchange D to manual exchanges A and B*

The handling of calls from terminating exchange D, through tandem exchange C, to manual exchanges A and B will now be described. For this purpose, it may be assumed that a subscriber at pay station #2021 (Fig. 2, part 3) desires to make a call to or through one of the manual exchanges A and B, manual exchange A, for example.

D1. *Calling tandem exchange C*

When the receiver is removed at pay station #2021, an idle one of the connectors C1' to CX' is linked to the calling line #202 by operation of the associated one of the finders F1' to FX' under the control of the distributor DR' as hereinbefore described. Such connector thereupon returns a dial-tone signal to the calling pay station line, and it responds to the digit 0, when dialed, to extend connection to tandem exchange C over an idle one of the interexchange trunk lines C—T1 to C—T6. It may be assumed that trunk line C—T1 is idle and allotted at this time and is therefore seized, by way of repeater R1 of Figs. 2 and 6.

When the repeater R1 is seized in the terminating exchange D, it is prepared for outgoing operation as hereinbefore described, its relays 613, 611, 608, 617, and 618 operating.

The repeater 8R—1 in exchange C is now prepared for operation responsive to the bridging of the associated trunk line C—T1 in the repeater R1 as hereinbefore described.

An idle connector in tandem exchange C is now linked to the associated line multiple #231 by finder operation. It may be assumed that the finder F1 operates to link the connector C1 to the calling multiple #231. The connector C1 is thereupon prepared for operation.

D2. *Calling manual exchange A*

When the calling subscriber in exchange D, on hearing the dial-tone signal now sent back from the connector C1 in exchange C, dials the digit 0 assigned to the manual exchange A from the standpoint of exchange C, the ten momentary interruption impulses constituting such digit are repeated by the repeater R1 of Fig. 6 to the repeater 8R—1, and are thereat repeated to the seized connector C1. As a result, the connector C1 operates as described in the parent application to cause connection to be made with the called manual exchange A, by way of the trunk line A—T1 for example. This connection is made by way of line multiple #211 and the repeater 0R—1.

As explained in the parent application, ringing current is now sent momentarily over the trunk line A—T1 to signal the operator in exchange A.

D3. *Answered supervision*

When the operator in the called manual exchange A answers a call, operations occur, as described in the parent application, in repeaters 0R—1 and 8R—1 to reverse the direction of current flow over the trunk line C—T1, to relay answered supervision to the repeater R1 in exchange D.

In the repeater R1, polarized supervisory relay 609 now responds and operates outgoing supervisory-control relay 614.

D3a. *Barring current reversal at repeater R1*

Outgoing supervisory relay 621 is not operated at this time because it is maintained disconnected at the lower contacts of the operated digit-counter relay 620, relay 620 not having been restored in the present call, because only a single digit was dialed, following the seizure of the repeater R1, to extend connection to the called manual exchange. The current flow is, therefore, not reversed in the calling pay-station line, wherefore the calling pay-station subscriber is able to carry on a conversation with the operator in the manual exchange without first depositing a coin, as he is obliged to do before conversing when a subscriber of either of the automatic exchanges is called.

Upon operating as above noted, outgoing supervisory-control relay 614 disconnects series relay 607 at its middle lower contacts; at its upper contacts, it closes a parallel bridge across the conductors of truck line C—T1 including the 30,000-ohm right-hand winding of polarized supervisory relay 609, for a purpose to be subsequently brought out; and at the back contact of its inner lower armature, it disconnects class-tone relay 617.

D3b. *Class-tone signaling at repeater R1*

Class-tone relays 617 and 618, both of which are slow-restoring relays as indicated, now restore successively. During the time required for relay 618 to restore after relay 617 restores, the upper winding of transformer 616 is bridged across the talking circuit in series with condenser 630, to relay to the talking circuit any tone signal which may be impressed on the sleeve conductor of the calling line. Such sleeve conductor is now extended, through the finder connector link in use to the sleeve conductor S of the associated line multiple #211, and this conductor is extended to ground through the lower winding of transformer 616. The sleeve conductor of the line multiple associated with the calling pay-station line #202 (Fig. 2, part 3) may have a class-tone connection made thereto from a common class-tone lead through an individual condenser, as illustrated in Fig. 10 of the parent application in connection with line multiple #203 associated with pay station #2031 of tandem exchange C. The pay-station tone is thus received at the lower winding of transformer 616 and is induced in the upper winding thereof and impressed across the conductors of the talking circuit through condenser 630 and the contacts of relays 617 and 618 during the short interval in which relay 618 remains operated after relay 617 restores. The pay-station tone signal is thus sent back over the talking circuit to the called manual exchange to be heard by the answering operator. The operator is thereby informed that the call is from a pay station.

The calling pay-station subscriber may now converse with the operator as desired, not having to first deposit a coin.

D4. *Recalling the called manual-exchange operator*

While the established connection is in a state of answered supervision (that is, after the operator answers and before she disconnects), the calling pay-station subscriber may recall the operator by momentarily depressing his hookswitch one or more times to cause operations to occur resulting in a flashing of the answering supervisory lamp in the cord circuit in the manual exchange.

When the hookswitch is depressed at the calling substation in terminating exchange D, outgoing line relay 613 of the repeater R1 restores. Series relay 607 does not operate at this time as it is disconnected at contacts of outgoing supervisory-control relay 614, whereby the setting of digit-counter relays 619 and 620 is not interfered with.

Outgoing release relay 611 restores a short interval following the restoration of outgoing line relay 613, but outgoing transfer relay 608 remains operated nevertheless, through the inner lower armature and front contact of outgoing supervisory-control relay 614. As a result, outgoing transfer relay 608 maintains the associated sleeve conductor grounded at its inner upper contacts to maintain the connection established in the local exchange. At its upper contacts, line relay 613 opens the previously traced low-resistance bridge across the conductors of trunk line C—T1 through the left-hand winding of polarized supervisory relay 609, but relay 609 remains operated at this time in a high-resistance bridge including both windings of relay 609 in series, and the upper contacts of outgoing supervisory-control relay 614. Contacts 650 are thereby maintained closed to maintain relay 614 operated.

In the tandem exchange C, the above-noted substitution of a high-resistance holding bridge (in the repeater R1) for the previously established low-resistance holding bridge, across the conductors of trunk line C—T1, causes the repeater 8R—1 to act similarly with respect to its holding bridge for repeater 6R—1. The latter repeater reverses the existing current flow over the conductors of trunk line A—T1, causing the operator's supervisory lamp (not shown) in the cord circuit to become lighted.

When the calling subscriber in exchange D again releases the hookswitch and permits the contacts thereof to close, the above-described operations are reversed, resulting in the extinguishment of the supervisory lamp in the called manual exchange. The act of depressing the hookswitch momentarily may be repeated as many times as desired, causing the operator's supervisory lamp to flash to call her attention to the fact that the calling subscriber desires to converse with her again.

D5. *Clearing out*

When the calling subscriber has replaced his receiver and the operator has taken down the connection in the manual exchange, the entire connection is cleared out. The clearing out of the connection occurs in either of two ways, depending upon whether the operator disconnects first or the calling subscriber replaces his receiver first. The more usual operation is for the calling subscriber to replace his receiver first, and the clearing-out operations will be described under this assumption.

When the receiver is replaced at the calling substation, operations as hereinbefore described in connection with the temporary depression of the hookswitch contacts occur to cause the supervisory lamp to become lighted in the manual exchange, being lighted steadily at this time as a disconnect signal. When the operator responds to the disconnect signal, by removing her plug from the jack J3, the repeater 6R—1 responsively reverses current flow to repeater 8R—1, which responsively reverses the current flow over trunk line C—T1 to normal direction.

In the calling exchange D, polarized supervisory relay 609 of repeater R1 (which was being held operated in a high-resistance bridge including both its windings and the upper contacts of relay 614) restores when the current flow over trunk line C—T1 is reversed back to normal direction by the restoration of incoming supervisory relay 515. Upon restoring, relay 609 open-circuits and restores outgoing supervisory-control relay 614. At the front contact of its inner lower armature, relay 614 open-circuits and restores digit-counter relay 619 and outgoing transfer relay 608. Relay 608 thereupon ungrounds the associated sleeve lead at its inner upper contacts, returning the repeater R1 and associated line circuit LC—211' to normal condition and clearing out the portion of the connection in exchange D between the calling line and the repeater R1.

E. *Permanent timing at the repeater R1*

Repeater R1 (Fig. 3) is provided with release-timer relay 615 and has associated therewith common start lead 1356', common pickup lead P1', and common lead H1', associated with the two-minute timer in terminating exchange D similar to the timer T (Fig. 13, part 6 of the parent application) in exchange C.

When the repeater R1 is seized in exchange D on a call outgoing to exchange C, outgoing release relay 611 completes a circuit connection at its lower armature and front contact between pickup lead P1 and the winding of release-timer relay 615.

If the call has not been answered, to thereby cause outgoing supervisory relay 614 to operate, before lead P1 is next grounded, release-timer relay 615 operates over lead P1 and locks itself at its lower armature to ground through contacts of series relay 607 and the inner contacts of outgoing release relay 611.

If no dialing occurs during the next two-minute interval (to operate series relay 607), and if the call is not answered during this interval (to operate outgoing supervisory-control relay 614), relay 615 remains operated, and the associated sleeve conductor remains dependent upon the continued application of ground potential to the common hold lead H1'. Under this condition, when hold lead H1' is next ungrounded the associated sleeve lead is consequently ungrounded, permitting the connection to clear out and causing the calling line circuit to be placed in lockout condition as described for other line circuits in the parent application.

The connection is similarly released following conversation (and the consequent restoration of relay 614) if theh calling subscriber does not replace his receiver in the meantime.

F. *Allotter control at repeater R1*

The repeater R1 controls the #1 allotter relay in the associated trunk allotter over the allotter conductors 641 as explained in the parent application in connection with the repeater 0R—1 and trunk allotter TA—0. When the repeater R1 is in use as an incoming repeater, conductors 641 are separated at the lower contacts of incoming transfer relay 610. When the repeater is in use as an outgoing repeater, conductors 641 are separated at the lower contacts of outgoing transfer relay 608. Conductors 641 are thus maintained separated at any time when the repeater R1 (and consequently the associated interexchange trunk line C—T1) is in use, being joined together at all other times to indicate an idle condition of the trunk line to the associated allotter.

I claim:

1. In a telephone system including a terminating automatic exchange, a tandem automatic exchange, and a manual exchange, said exchanges being interconnected by trunk lines between the tandem exchange and the other said exchanges, trunk lines outgoing from the terminating exchange to the tandem exchange, each of said trunk lines having a repeater interposed therein in the terminating exchange, the switching arrangement in the tandem exchange being such that the dialing of a given number of digits after seizure of one of said trunk lines causes connection to be extended through the tandem exchange to the manual exchange, while the extending of a connection through the tandem exchange to a subscriber line thereof requires the dialing of a greater number of digits, circuit arrangements effective on all calls outgoing from the terminating exchange to or through the tandem exchange for relaying answered supervision back to the concerned repeater in the terminating exchange, a digit counter in said repeater effective to count a sufficient number of the digits dialed after such repeater is seized to determine whether the call is a manual-exchange call or is for a subscriber line of the tandem exchange, means including means rendering it controlled by said digit counter according to the number of digits counted thereby, for reversing the current flow toward the calling line responsive to the received answered supervision, and circuit arrangements connected with subscriber lines of the terminating exchange for exacting a charge for the calls made therefrom responsive to such current reversal.

2. In an automatic telephone system, links, automatic switching apparatus for extending connections from calling lines to said links, other automatic switching apparatus including means rendering it responsive to series of digit impulses dialed after connection is extended to any one of said links, for completing the connection to a desired called line, certain of said connections being of one class and requiring the dialing of a given number of digits after connection has been extended to one of said links, other of said connections being of another class and requiring the dialing of a greater number of digits after the connection has been extended to one of said links, charge-exacting means connected with certain of said calling lines, means including means rendering it responsive to the setting up of a connection through any one of said links from any one of said certain lines, for operating said charge-exacting means or not, depending upon the class of the connection, said operating means including a digit counter effective to count a sufficient number of the digits dialed after connection is made to one of said links to determine the class of the connection.

3. In an automatic telephone system, links, automatic switching apparatus for extending connections from calling lines to said links, other automatic switching apparatus including means rendering it responsive to series of digit impulses dialed after connection is extended to any one of said links, for completing the connection to a desired called line, certain of said connections being of one class and requiring the dialing of a given number of digits after connection has been extended to one of said links, other of said connections being of another class and requiring the dialing of a greater number of digits after the connection has been extended to one of said links, control means in any of said links including means rendering it responsive to received answered supervision, for reversing the current flow toward the calling line, or not, depending upon the class of the connection, said control means including a digit counter effective to count a sufficient number of the digits dialed after connection is made to one of said links to determine the class of the connection.

4. In an automatic telephone system, lines of two classes, links, automatic switching apparatus for extending connections from calling lines to said links, other automatic switching apparatus including means rendering it responsive to series of digit impulses dialed after connection is extended to any one of said links, for completing the connection to any desired called line of either class, charge-exacting means connected with certain of said calling lines, control means including means rendering it responsive to the setting up of a connection through any one of said links from any one of said certain lines, for operating said charge-exacting means or not, depending upon the class of the line called, said control means including digit-responsive means operable after connection is made to one of said links to determine the class of the connection.

5. In a telephone system including a terminating automatic exchange, a tandem automatic exchange, and a manual exchange, said exchanges being interconnected by trunk lines between the tandem exchange and the other said exchanges, each trunk line outgoing from the terminating exchange to the tandem exchange having a repeater interposed therein in the terminating exchange, the switching arrangement in the tandem exchange being such that the dialing of a given number of digits after seizure of one of said trunk lines causes connection to be extended through the tandem exchange to the manual exchange, while the extending of a connection through the tandem exchange to a subscriber line thereof requires the dialing of a greater number of digits, circuit arrangements effective on all calls outgoing from the terminating exchange to or through the tandem exchange for relaying answered supervision back to the concerned repeater in the terminating exchange, a digit counter in said repeater effective to count a sufficient number of the digits dialed after such repeater is seized to determine whether the call is a manual-exchange call or is for a subscriber line of the tandem exchange, and means including means rendering it controlled by said digit counter according to the number of digits counted thereby, for reversing, or not reversing, the current flow toward the calling line responsive to the received answered supervision.

6. In a telephone system including a terminating automatic exchange, a tandem automatic exchange, and a manual exchange, said exchanges being interconnected by trunk lines between the tandem exchange and the other said exchanges, trunk lines outgoing from the terminating exchange to the tandem exchange, each of said trunk lines having a repeater interposed therein in the terminating exchange, the switching arrangement in the tamden exchange being such that the dialing of a given number of digits after seizure of one of said trunk lines causes connection to be extended through the tandem exchange to the manual exchange, while the extending of a connection through the tandem exchange to a subscriber line thereof requires the dialing of a greater number of digits, circuit arrangements effective on all calls outgoing from the terminating exchange to or through the tandem exchange for relaying answered supervision back to the concerned repeater in the terminating exchange, a digit counter in said repeater effective to count a sufficient number of the digits dialed after such repeater is seized to determine whether the call is a manual-exchange call or is for a subscriber line of the tandem exchange, and means including means rendering it controlled by said digit counter according to the number of digits counted thereby, for exacting a charge if the connection has been completed to a subscriber line of the tandem exchange, but not if it has been completed to the manual exchange.

PIER BAKKER.

REFERENCES CITED

The following references are of record in the file of this patent:

UNITED STATES PATENTS

| Number | Name | Date |
|---|---|---|
| 1,337,782 | Lundell | Apr. 20, 1920 |
| 1,415,001 | Martin | May 2, 1922 |
| 1,667,915 | Wicks | May 1, 1928 |
| 1,675,310 | Saville | June 26, 1928 |
| 1,855,724 | Nelson | Apr. 26, 1932 |
| 1,855,779 | Tharp | Apr. 26, 1932 |
| 1,917,884 | Hague | July 11, 1933 |
| 1,944,269 | Raynsford et al. | Jan. 23, 1934 |
| 2,192,025 | Busch | Feb. 27, 1940 |
| 2,226,731 | Lomax | Dec. 31, 1940 |